April 12, 1927.

H. D. MEYER

ROAD DRAG

Filed July 15, 1925

1,624,421

3 Sheets-Sheet 1

Henry D. Meyer  Inventor

Witnesses

By Richard B. Owen

Attorney

April 12, 1927.

H. D. MEYER 1,624,421

ROAD DRAG

Filed July 15, 1925

3 Sheets-Sheet 3

Inventor
Henry D. Meyer

Witnesses

By Richard B. Oliver

Attorney

Patented Apr. 12, 1927.

1,624,421

UNITED STATES PATENT OFFICE.

HENRY D. MEYER, OF MILFORD, ILLINOIS.

ROAD DRAG.

Application filed July 15, 1925. Serial No. 43,827.

This invention relates to road drags, and has more particular reference to an improved road drag attachment for tractors.

The primary object of the invention is to provide a road drag attachment of the above kind which is extremely simple and durable in construction as well as efficient in operation.

A further object of the invention is to provide a road drag attachment of the above kind embodying drag sections and practical and durable means for attaching the drag sections to the tractor.

With the above general objects in view, and others that will become apparent as the nature of the invention is better understood, the same consists in the novel form, combination and arrangement of parts hereinafter more fully described, shown in the accompanying drawings and claimed.

Figure 1:
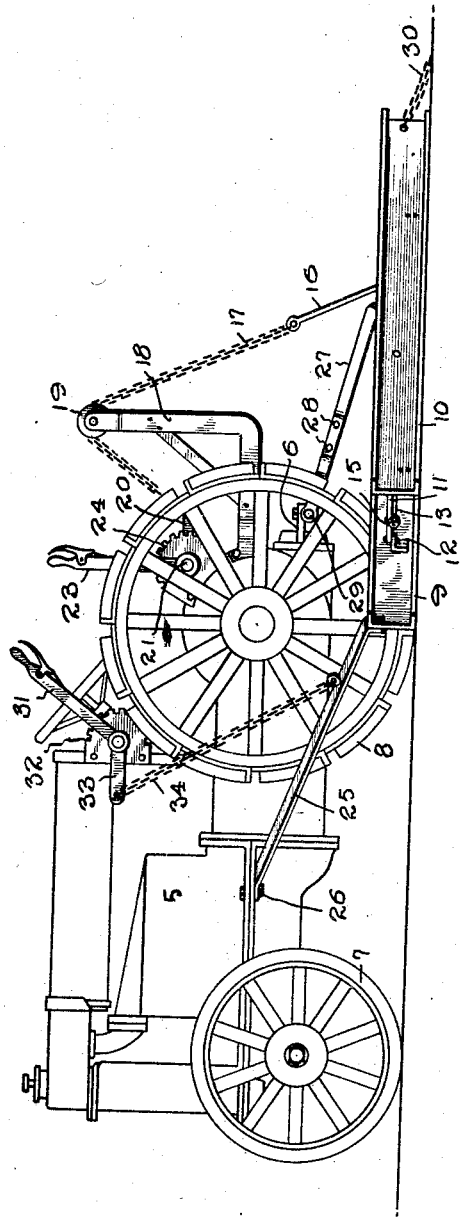
Figure 2:
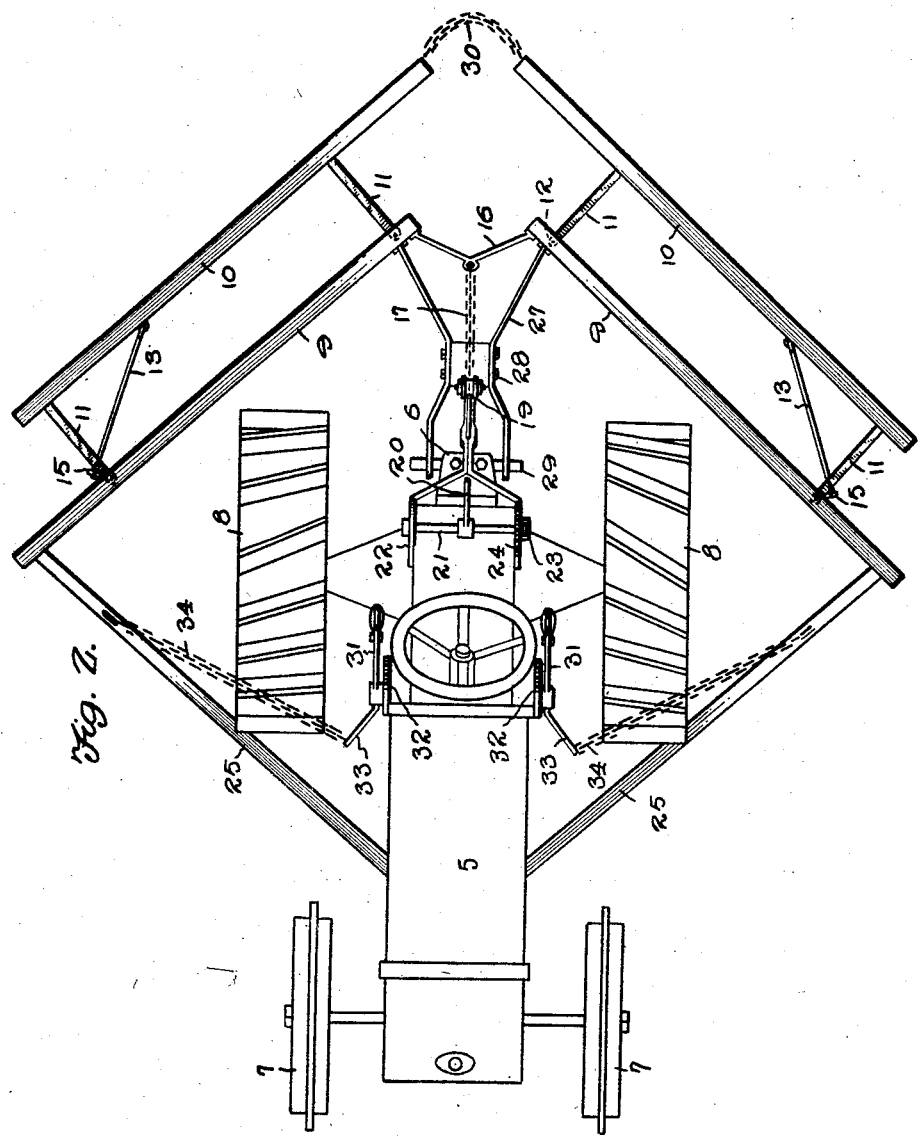
Figure 3:
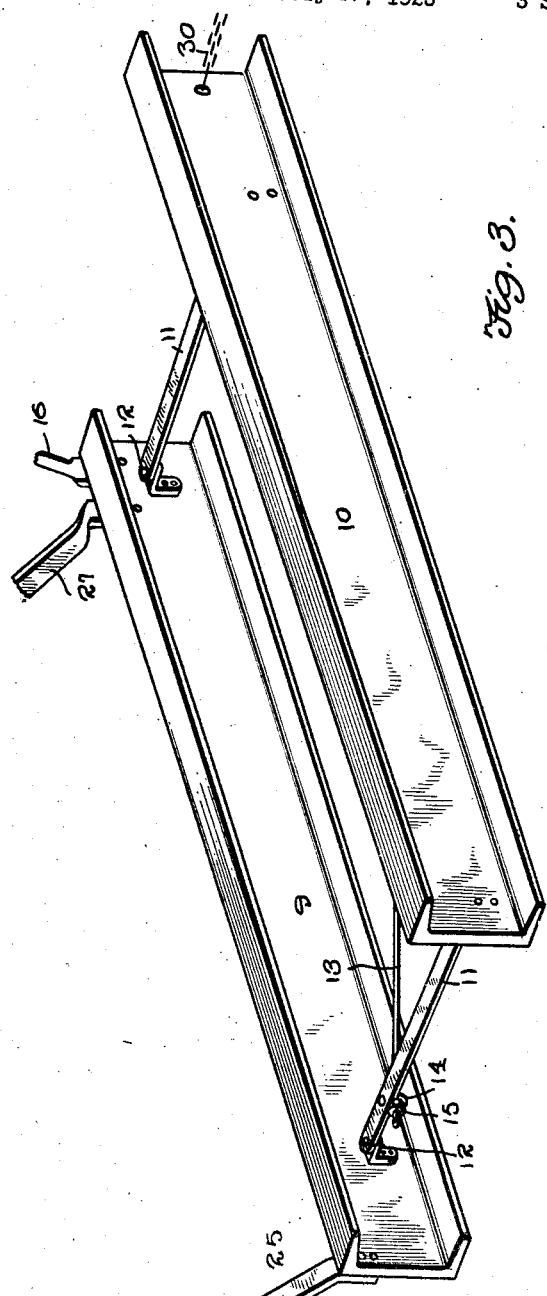

In the drawings wherein like reference characters indicate corresponding parts throughout the several views, Figure 1 is a side elevational view showing a tractor equipped with a road drag attachment constructed in accordance with the present invention, Figure 2 is a top plan view of the device shown in Figure 1, and Figure 3 is an enlarged fragmentary perspective view showing one of the drag sections.

Referring more in detail to the drawings, 5 indicates generally the tractor which may be of any well known type equipped centrally of its rear end with a rearwardly projecting draw bar 6 and which is provided with front steering and supporting wheels 7 and rear driving and supporting wheels 8.

The present invention or road drag attachment embodies a pair of drag sections arranged in angular relation and adapted to be connected to the tractor so as to be drawn over the roadway by the latter and so as to be disposed at the rear of the tractor in forwardly diverging relation obliquely of the road. Each drag section embodies a pair of spaced parallel drag bars 9 and 10 preferably formed of channel iron and of similar lengths. The drag bars 9 and 10 of each drag section are arranged in offset relation so as to have their ends terminate substantially in the same plane longitudinally of the tractor as shown clearly in Figure 2, and for connecting the drag bars of each section for maintaining them in this relation I provide flexible connecting rods 11 which are attached to the rear drag bar 10 and pivoted to the front drag bar 9 as at 12. Longitudinal shifting of the drag bars 9 and 10 relative to each other is effectively prevented by means of diagonal brace rods 13, one of which is provided for each drag section. The diagonal brace rod 13 of each drag section is attached to the rear drag bar 10 of the latter inwardly of the forward connecting rod 11 and extended forwardly to and attached to the latter. The forward connecting rod 11 may have a depending ear 14 through which the forward end of the brace rod 14 projects as clearly shown in Figure 3, and the forward end of the brace rod 13 may be threaded for reception of a nut 15 whereby the brace rod 13 may be maintained under proper tension.

The adjacent inner ends of the forward drag bars 9 of the drag sections are connected by a connecting strip 16 to the central portion of which is attached one end of a flexible member or chain 17, and rigidly secured to the rear end of the tractor frame midway between the sides thereof and above the draw bar 6 is a bracket having an upwardly projecting rear end portion or arm 18 in the upper end of which is journaled a guide pulley 19 over which the flexible member or chain 17 passes. After passing forwardly and upwardly over the guide pulley 19, the chain 17 is attached to a rearwardly projecting arm 20 fixed to a transversely extending horizontal rock shaft 21 that is suitably journaled in bearings 22 provided upon the tractor frame. A hand lever 23 is secured upon one end of the rock shaft 21 and has a suitable latch cooperating with a rack segment 24 also fixed to the tractor frame.

Suitable forwardly converging draft bars 25 are rigidly attached at their rear outer ends to the forward outer ends of the front drag bars 9 and are adapted to be secured at their inner forward ends to opposite sides of the tractor 5 forwardly of the rear driving and supporting wheels 8 of the latter as indicated at 26 in Figure 1.

The inner rear ends of the front drag bars 9 are rigidly attached to the rear end of a draft bar whose forward end is detachably connected to the draw bar 6 of the tractor, and the latter draft bar embodies a pair of spaced straps 27 which are rigidly connected in spaced relation intermediate their ends as generally indicated at 28 and through the forward ends of which project a transverse shaft 29 the portion of which between the strips 27 is adapted to be engaged by the draw bar 6. The rear end of each draft bar strip 27 is attached to the rear inner end of one of the forward drag bars 9 as clearly shown in Figure 2, and it will thus be seen that effective means is provided for causing movement of the drag sections over the roadway or causing the same to be drawn over the roadway upon forward movement of the tractor and wherein the proper angular relation of the drag sections is maintained. The adjacent inner ends of the drag sections are disposed in slightly spaced relation, and connecting the adjacent inner ends of the rear drag bars 10 is a drag chain 30 adapted to smooth the central part of the road crown without exerting a scraping action thereon.

Suitable means is associated with the forward end of each drag section for permitting the operator of the tractor to lower and raise the forward end of said drag section, and each means may include a hand lever 31 pivoted to the adjacent side of the tractor and having a latch associated with a fixed rack segment 32, the lever 31 having a forwardly projecting arm rigid with the pivoted end thereof to which is attached one end of a flexible member or chain 34 whose other end is suitably connected with the forward end of the drag section at the adjacent side of the tractor. The latter connection may be indirect by attaching the chain 34 to the adjacent draft bar 25 as shown, and if found necessary any suitable form of guide may be employed for insuring the chains 34 from engaging and interfering with the rotation of the rear supporting and driving wheels 8. Obviously, the drag bars 9 and 10 may be provided with scraping blades if found necessary or desirable. It will also be seen that by actuating the levers 31 so as to sufficiently lower the arms 33, the outer ends of the drag sections may be lowered whereby said drag sections are positioned at an inclination for securing proper crowning of the road. Further, by swinging the arms 33 upwardly a sufficient distance and also swinging the arm 20 downwardly a sufficient distance the chains or flexible members 17 and 34 will be caused to elevate the drag sections entirely clear of the ground when not in use. The latter is permitted by reason of the fact that the draft bars 25 are flexible and the shaft 29 is journaled in the draw bar 6 of the tractor. However, the axle 29 may be fixed in the draw bar 6 and the forward ends of the straps 27 journaled upon the projecting ends of the axle 29 if found desirable.

The general dragging operation of the present invention is substantially similar to that of other road drags now in common use.

Minor changes may be made without departing from the spirit and scope of the invention as claimed.

What I claim as new is:

1. The combination with a tractor having a rearwardly projecting draw bar at the rear end thereof, of a road drag attachment therefor including a pair of drag sections, rigid draft bars secured to the forward outer ends of the drag sections and to opposite sides of the tractor, a draft bar having one end rigidly attached to the inner adjacent ends of the drag sections and its opposite end pivotally secured to the draw bar of the tractor, a rigid connecting strip having its opposite ends secured to the inner adjacent ends of the drag sections, and means carried by the tractor and associated with the rigid connecting strip for raising and lowering the said drag sections.

2. The combination with a tractor having a rearwardly projecting draw bar at the rear end thereof, of a road drag attachment therefor including a pair of drag sections, rigid draft bars attached at one end to the forward outer ends of the drag sections and at their opposite ends to the opposite sides of the tractor, a draft bar having one end rigidly attached to the adjacent inner ends of the drag sections and its opposite end pivotally connected to the draw bar of the tractor, a rigid connecting strip having its opposite ends secured to the inner adjacent ends of the drag sections, a flexible element having one end secured to the said connecting strip and means carried by the tractor and having the opposite end of the said flexible element attached thereto whereby upon operation of the said last named means, the drag sections will be raised or lowered.

3. The combination with a tractor having a rearwardly projecting draw bar at the rear end thereof, of a road drag attachment therefor including a pair of drag sections, rigid draft bars attached to the forward outer ends of the drag sections and to the opposite sides of the tractor, a draft bar having one end rigidly attached to the adjacent inner ends of the drag sections and its opposite end pivotally connected to the draw bar of the tractor, a rigid connecting strip having its opposite ends secured to the inner adjacent ends of the drag sections, a shaft carried by the tractor, an arm carried by said shaft and having secured thereto the opposite end of the said flexible element, means for rotating the said shaft, hand levers carried by the said tractor, arms carried by the said levers, and flexible elements having their opposite ends secured to the said first named rigid draft bars and to the last named arms.

In testimony whereof I affix my signature.

HENRY D. MEYER.